(12) United States Patent
Ikenishi et al.

(10) Patent No.: US 8,883,330 B2
(45) Date of Patent: *Nov. 11, 2014

(54) GLASS FOR CHEMICAL STRENGTHENING, SUBSTRATE FOR INFORMATION RECORDING MEDIA AND INFORMATION RECORDING MEDIA

(75) Inventors: Mikio Ikenishi, Tokyo (JP); Xuelu Zou, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/022,363

(22) Filed: Feb. 7, 2011

(65) Prior Publication Data

US 2011/0159322 A1 Jun. 30, 2011

Related U.S. Application Data

(62) Division of application No. 10/532,863, filed as application No. PCT/JP03/13770 on Oct. 28, 2003, now Pat. No. 7,964,298.

(30) Foreign Application Priority Data

Oct. 29, 2002 (JP) ................................. 314903/2002

(51) Int. Cl.

| G11B 5/735 | (2006.01) |
|---|---|
| C03C 21/00 | (2006.01) |
| C03C 3/00 | (2006.01) |
| G11B 5/73 | (2006.01) |
| C03C 3/087 | (2006.01) |

(52) U.S. Cl.
CPC ............ *G11B 5/7315* (2013.01); *C03C 21/002* (2013.01); *C03C 3/087* (2013.01)
USPC ............................. 428/846.9; 501/55; 65/33.1

(58) Field of Classification Search
CPC ............ C03C 4/16; C03C 4/20; C03C 3/085; C03C 2201/00; G11B 2220/20
USPC .................. 428/846.9, 848.8, 848, 410, 64.1; 501/32, 66, 54.53, 59, 62, 69, 55, 8, 501/77, 78; 65/29.19, 29.21, 33.1, 33.4; 360/135, 99.2; 365/199

See application file for complete search history.

(56) References Cited

U.S. PATENT DOCUMENTS

| 5,776,844 | A | | 7/1998 | Koch et al. | |
|---|---|---|---|---|---|
| 5,780,371 | A | | 7/1998 | Rifqi et al. | |
| 5,900,296 | A | * | 5/1999 | Hayashi et al. | ............... 428/64.1 |
| 5,958,812 | A | | 9/1999 | Koch et al. | |
| 6,114,039 | A | | 9/2000 | Rifqi | |
| 6,187,441 | B1 | * | 2/2001 | Takeuchi et al. | ............... 428/410 |
| 6,297,182 | B1 | * | 10/2001 | Maeda et al. | .................... 501/66 |
| 6,332,338 | B1 | * | 12/2001 | Hashimoto et al. | ........... 65/29.21 |
| 6,376,084 | B1 | * | 4/2002 | Kishimoto et al. | ............ 428/426 |
| 6,387,510 | B1 | * | 5/2002 | Nakashima et al. | ............ 428/426 |
| 6,436,859 | B1 | * | 8/2002 | Muramoto et al. | .............. 501/69 |
| 6,818,576 | B2 | | 11/2004 | Ikenishi et al. | |
| 7,964,298 | B2 | * | 6/2011 | Ikenishi et al. | ............ 428/846.9 |
| 2001/0041657 | A1 | * | 11/2001 | Abe et al. | .......................... 501/8 |
| 2002/0009600 | A1 | * | 1/2002 | Peng et al. | ..................... 428/426 |
| 2002/0039958 | A1 | * | 4/2002 | Goto | ............................... 501/55 |
| 2002/0110706 | A1 | * | 8/2002 | Miyamoto | ..................... 428/846 |
| 2003/0099062 | A1 | * | 5/2003 | Kataoka et al. | ............. 360/99.12 |

(Continued)

FOREIGN PATENT DOCUMENTS

| JP | 10-72238 | | 3/1998 | |
|---|---|---|---|---|
| WO | WO 01/21539 | * | 3/2001 | .............. C03C 10/04 |

OTHER PUBLICATIONS

JA 10-72238 Abstract Speit, Mar. 1998.
JA 10-72238 Translation, Mar. 1998.

*Primary Examiner* — Kevin M. Bernatz
*Assistant Examiner* — Louis Falasco
(74) *Attorney, Agent, or Firm* — Sughrue Mion, PLLC

(57) ABSTRACT

A glass for use in chemical reinforcement for use in a substrate of an information recording medium, having a composition comprising, denoted as mol %:

| | |
|---|---|
| $SiO_2$ | 47 to 70% |
| $Al_2O_3$ | 1 to 10% |
| (where the total of $SiO_2$ and $Al_2O_3$ is 57 to 80%) | |
| CaO | 2 to 25% |
| BaO | 1 to 15% |
| $Na_2O$ | 1 to 10% |
| $K_2O$ | 0 to 15% |
| (where the total of $Na_2O$ and $K_2O$ is 3 to 16%) | |
| $ZrO_2$ | 1 to 12% |
| MgO | 0 to 10% |
| SrO | 0 to 15% |
| (where the ratio of the content of CaO to the total of MgO, CaO, SrO, and BaO is greater than or equal to 0.5) | |
| ZnO | 0 to 10% |
| (where the total of MgO, CaO, SrO, BaO, and ZnO is 3 to 30%) | |
| $TiO_2$ | 0 to 10% | and the total content of the above-stated components is greater than or equal to 95%. A glass for use in chemical reinforcement for use in the substrate of an information recording medium employed in a perpendicular magnetic recording system, in which the glass exhibits the glass transition temperature is greater than or equal to 600° C. A substrate for use in an information recording medium consisting of the above glass and being chemically reinforced. A substrate for an information recording medium consisting of a chemically reinforced glass having a glass transition temperature of greater than or equal to 600° C. and exhibiting a bending strength following heating for two hours at 570° C. of greater than or equal to 15 $kgf/mm^2$. An information recording medium comprising an information recording layer on the above substrate for an information recording medium. The present invention provides glass having both high thermal resistance and high strength, a substrate for use in information recording media comprised of this glass, and an information recording medium employing such a substrate.

24 Claims, No Drawings

(56) References Cited

U.S. PATENT DOCUMENTS

| | | |
|---|---|---|
| 2003/0109370 A1 | 6/2003 | Ikenishi et al. |
| 2003/0129414 A1* | 7/2003 | Ota et al. ............... 428/426 |
| 2003/0194583 A1* | 10/2003 | Miyamoto ............. 428/848.9 |
| 2003/0223280 A1* | 12/2003 | Okumura et al. ............ 365/199 |
| 2003/0228968 A1* | 12/2003 | Usui et al. ................ 501/32 |
| 2005/0079391 A1* | 4/2005 | Ikenishi et al. ............ 428/846 |
| 2005/0181218 A1* | 8/2005 | Shiraishi et al. ............ 428/426 |

\* cited by examiner

GLASS FOR CHEMICAL STRENGTHENING, SUBSTRATE FOR INFORMATION RECORDING MEDIA AND INFORMATION RECORDING MEDIA

TECHNICAL FIELD

This is a Divisional of application Ser. No. 10/532,863 filed Feb. 8, 2006, claiming priority based on Patent Application No. 2002-314903 filed Oct. 29, 2002, the contents of all of which are incorporated herein by reference in their entirety.

The present invention relates to chemically reinforced glass having high thermal resistance and high strength. The present invention further relates to a substrate for an information recording medium of chemically reinforced glass having both high thermal resistance and high strength, and to an information recording medium employing this substrate. In particular, the present invention relates to a substrate for a magnetic recording medium suited to the manufacturing with a high-temperature sputtering device of magnetic films employed in perpendicular magnetic recording systems, and to a magnetic recording medium.

BACKGROUND ART

In recent years, as recording has been conducted at ever greater density in information recording devices such as magnetic disks, typified by hard disks, there has been demand for a change from longitudinal magnetic recording systems to perpendicular magnetic recording systems. That is, it has been pointed out that in longitudinal magnetic recording systems, since the magnetic zone is readily rotated by heat at about room temperature, it becomes impossible to write and data that have been written tend to be lost as the recording density increases. This phenomenon is known as the problem of thermal fluctuation and is becoming an ever greater impediment in longitudinal magnetic recording methods. Accordingly, in response to the problem of thermal fluctuation in longitudinal magnetic recording methods, there has been an active research of the practical use of perpendicular magnetic recording methods in recent years.

Known film structures employed in perpendicular magnetic recording methods include a single-layer film formed over a perpendicular magnetic recording layer on a nonmagnetic substrate, a double-layer film obtained by sequentially stacking a soft magnetic layer and a magnetic recording layer on a nonmagnetic substrate, and a three-layer film obtained by sequentially stacking a hard magnetic layer, a soft magnetic layer, and a magnetic recording layer on a nonmagnetic substrate. Of these, the two-layer film and three-layer film are better suited to achieving high recording densities and the maintenance of a stable magnetic moment than the single-layer film, leading to substantial development focusing on practical use in recent years. The improvement of the characteristics of such multilayer film perpendicular magnetic recording media requires film formation with a high-temperature film forming unit such as a high-temperature sputtering device and high-temperature treatment following film formation.

When employing a glass substrate affording good processing properties and reliability as the substrate of various information recording media, including the magnetic recording media employed in the above-mentioned perpendicular magnetic recording method, it is necessary to solve problems such as the following.

The glass substrate for information recording media is subjected to precision polishing such as lapping and polishing to impart extremely high flatness and surface smoothness. However, there is a problem in that since the substrate is exposed to elevated temperatures in the course of forming a film serving as the information recording layer, the glass softens and deforms unless the thermal resistance of the substrate is high, precluding use as an information recording medium. Thus, there is a need for a glass material with high thermal resistance that does not deform when exposed to elevated temperatures.

This high thermal resistance is an important characteristic for ensuring flatness in a static state. Flatness is also demanded in high-speed rotation since the reading and writing of information is conducted with the information recording medium being rotated at high speed. Thus, a substrate that does not yield at high-speed rotation, that is, a substrate of a material with a high Young's modulus, is required.

In the above-mentioned film-forming step, the glass substrate is held and conveyed into and out of a high-temperature film-forming device. In the course of this conveyance, a substrate that has been heated to an elevated temperature is rapidly cooled, subjecting the glass substrate, particular the portion being held, to substantial stress due to thermal contraction. Similarly, there is also a problem in that the glass substrate is also sometimes subjected to substantial thermal shock during high-temperature heat processing following film formation, with the substrate being damaged by this shock. Thus, there is a need for a high-strength glass substrate capable of adequately withstanding thermal shock.

Further, an information recording medium such as that mentioned above rotates at an extremely high speed of several thousand rpm during operation. Thus, there is a strong need to increasing the strength of the glass substrate to prevent damage during high-speed rotation.

An example of a glass employable as substrate in an information recording medium is the chemically reinforceable alumina silicate glass disclosed in Patent Reference 1 (Japanese Unexamined Patent Publication (KOKAI) Heisei No. 10-72238). However, from 8.5 to 15.5 mol % of $Na_2O$ is incorporated into the glass described in Patent Reference 1 to enhance the glass melt property and increase ion-exchange efficiency for chemical reinforcement. $Na_2O$ has the effect of decreasing the Young's modulus of the glass. Thus, the glass described in Patent Reference 1 has a low Young's modulus and substrates produced from the glass have poor flatness when rotated at high speed. Nor is application to information recording media employed in perpendicular magnetic recording systems suggested in any way in Patent Reference 1.

Accordingly, the present invention has for its object to provide glass having both high thermal resistance and high strength, a substrate for use in information recording media comprised of this glass, and an information recording medium employing such a substrate.

DISCLOSURE OF THE INVENTION

The means of achieving the above-stated object of the present invention are as follows:

(1) A glass for use in chemical reinforcement for use in the substrate of an information recording medium, having a composition comprising, denoted as mol %:

| | |
|---|---|
| $SiO_2$ | 47 to 70% |
| $Al_2O_3$ | 1 to 10% |
| (where the total of $SiO_2$ and $Al_2O_3$ is 57 to 80%) | |
| CaO | 2 to 25% |
| BaO | 1 to 15% |

-continued

| | |
|---|---|
| $Na_2O$ | 1 to 10% |
| $K_2O$ | 0 to 15% |
| (where the total of $Na_2O$ and $K_2O$ is 3 to 16%) | |
| (where the ratio of the total of CaO and BaO to the total of MgO, CaO, SrO, and BaO is greater than or equal to 0.5) | |
| $ZrO_2$ | 1 to 12% |
| MgO | 0 to 10% |
| SrO | 0 to 15% |
| ZnO | 0 to 10% |
| (where the total of MgO, CaO, SrO, BaO, and ZnO is 3 to 30%) | |
| $TiO_2$ | 0 to 10% | and the total content of the above-stated components is greater than or equal to 95%.

(2) The glass for use in chemical reinforcement described in (1) characterized in that the ratio of the BaO content to the total content of MgO, CaO, SrO, and BaO is greater than or equal to 0.15.

(3) A glass for use in chemical reinforcement for use in a substrate of an information recording medium employed in a perpendicular magnetic recording system, in which the glass exhibits the glass transition temperature of greater than or equal to 600° C.

(4) The glass for use in chemical reinforcement described in any of (1) to (3) above having a Young's modulus of greater than or equal to 75 GPa.

(5) A substrate for use in an information recording medium characterized by consisting of any of the glasses described in (1) to (4) above and being chemically reinforced.

(6) The substrate for use in an information recording medium described in (5) above employing a chemically reinforced glass in which the bending strength following heating for two hours at 570° C. to is greater than or equal to 15 $kgf/mm^2$.

(7) A substrate for an information recording medium characterized by consisting of a chemically reinforced glass having a glass transition temperature of greater than or equal to 600° C. and exhibiting a bending strength following heating for two hours at 570° C. of greater than or equal to 15 $kgf/mm^2$.

(8) The substrate for an information recording medium described in any of (5) to (7) above in which, when the bending strength of the glass constituting the substrate prior to chemical reinforcement is denoted as $f_b$ and the bending strength of the glass when maintained for two hours at a temperature T [° C.] (where T denotes any temperature of from 20 to 570° C.) after having been chemically reinforced is denoted as $f_T$, the value of $(f_T-f_b)/f_b$ is greater than or equal to 0.5.

(9) The substrate for use in an information recording medium of (7) above wherein the value of $(f_{20}-f_b)/f_b$ for the bending strength $f_{20}$ at T=20° C. is greater than or equal to 1.

(10) The substrate for use in an information recording medium described in any of (5) to (9) above wherein the average coefficient of linear expansion at 30 to 300° C. of the glass constituting the substrate is greater than or equal to $60 \times 10^{-7} K^{-1}$.

(11) The substrate for use in an information recording medium described in any of (5) to (10) above that is chemically reinforced by an ion exchange treatment in which sodium ions are replaced with potassium ions.

(12) The substrate for use in an information recording medium described in any of (5) to (11) above that is employed as a substrate for an information recording medium employed in a perpendicular magnetic recording system.

(13) An information recording medium characterized by comprising an information recording layer on the substrate for an information recording medium described in any of (5) to (11) above.

(14) The information recording medium described in (13) above in the form of a magnetic recording medium employed in a perpendicular magnetic recording system.

(15) The information recording medium described in (13) or (14) above characterized by being manufactured by subjecting a substrate having an information recording layer to a heat treatment at a maximum temperature of 300 to 600° C.

(16) A method of manufacturing an information recording medium comprising a step of forming a multilayered film comprising an information recording layer on the substrate for an information recording medium described in any of (5) to (11) above, characterized by further comprising the heating of the substrate on which the multilayered film has been formed to a temperature of from 300 to 600° C.

The substrate for an information recording medium of the present invention is of high strength due to chemical reinforcement; has a glass transition temperature of greater than or equal to 600° C., desirably greater than or equal to 620° C.; does not deform when exposed to temperatures of about 300 to 600° C., preferably about 400 to 600° C., is capable of maintaining a good shape; and has a high Young's modulus, thus affording good stability at high-speed rotation, deforming little even when rapidly rotated. Further, since the substrate for an information recording medium of the present invention has a value $(f_T-f_b)/f_b$ of greater than or equal to 0.5, it is able to maintain adequate bending strength even when subjected to a heat treatment of about 300 to 600° C., desirably about 400 to 600° C. Still further, since the substrate for an information recording medium of the present invention has a thermal expansion characteristic close to that of a metal, glass substrates for information processing media that can be firmly secured with metal fixtures can be provided. Further, since the information recording medium of the present invention has an information recording layer on such an information recording medium, high-temperature treatment can be conducted to impart high strength and high rotational stability. The information recording medium of the present invention is particularly suited to magnetic recording media employed in perpendicular magnetic recording systems, thus making it possible to provide information recording media of correspondingly higher recording density.

BEST MODE OF IMPLEMENTING THE INVENTION

The present invention is described in greater detail below.

The first glass for use in chemical reinforcement ("glass I" hereinafter) of the present invention is a chemically reinforced glass for use in the substrate of an information recording medium, having a composition, expressed in mol %, comprising:

| | |
|---|---|
| $SiO_2$ | 47 to 70% |
| $Al_2O_3$ | 1 to 10% |
| (where the total of $SiO_2$ and $Al_2O_3$ is 57 to 80%) | |
| CaO | 2 to 25% |
| BaO | 1 to 15% |
| $Na_2O$ | 1 to 10% |

| | |
|---|---|
| $K_2O$ | 0 to 15% |
| (where the total of $Na_2O$ and $K_2O$ is 3 to 16%) | |
| $ZrO_2$ | 1 to 12% |
| MgO | 0 to 10% |
| SrO | 0 to 15% |
| ZnO | 0 to 10% |
| (where the total of MgO, CaO, SrO, BaO, and ZnO is 3 to 30%) | |
| $TiO_2$ | 0 to 10% | where the total content of the above-stated components is greater than or equal to 95%. In the above-described glass, the ratio of CaO to the total content of MgO, CaO, SrO, and BaO (CaO/(MgO+CaO+SrO+BaO)) is desirably greater than or equal to 0.5, preferably greater than or equal to 0.55, and more preferably greater than or equal to 0.6. The role and composition range of each component of glass I will be described here.

$SiO_2$ is a major component of the network former of the glass. When the content thereof is less than 47%, the thermal stability of the glass tends to decrease and the glass tends to devitrify. Durability also decreases sharply and extreme corrosion tends to occur due to the cleaning solution of hydrofluorosilicic acid employed to clean the glass surface. When 70% is exceeded, the Young's modulus of the glass decreases and viscosity at high temperature increases, causing glass melt properties to deteriorate sharply. Accordingly, the $SiO_2$ content of glass I falls within the range of 47 to 70%, preferably 50 to 67%.

$Al_2O_3$ is a component that both contributes greatly to improving the durability and thermal resistance of the glass and is extremely important as a component enhancing the stability and rigidity of the glass structure. However, at a content of less than 1%, the effect of inhibiting the dissolution of alkali out of the glass tends to diminish, making it difficult to obtain a glass with good durability. When 10% is exceeded, the high-temperature melt property of the glass deteriorates. Accordingly, the content range is set to from 1 to 10%, preferably from 2 to 10%.

In the glass for use in chemical reinforcement of the present invention, the total content of $SiO_2$ and $Al_2O_3$ falls within a range of 57 to 80%, preferably 57 to 79%. When this total content is less than 57%, there is a risk of the glass being inadequately durable. When 80% is exceeded, the Young's modulus and the coefficient of thermal expansion decrease. Further, viscosity at high temperature increases, compromising melt properties.

MgO, CaO, SrO, BaO, and ZnO are components that decrease the viscosity of the glass melt, promote melting, increase the Young's modulus, and increase the coefficient of thermal expansion. However, when the total content thereof exceeds 30%, the durability of the glass tends to deteriorate, heat stability decreases, and devitrification tends to occur. Further, when the total content is less than 3%, the glass transition temperature tends to decrease and high-temperature viscosity increases. Further, when an alkali metal oxide is introduced instead of an alkaline earth metal oxide, the Young's modulus drops. Accordingly, the total content of MgO, CaO, SrO, BaO, and ZnO in glass I is set to from 3 to 30%, preferably from 3 to 25%.

CaO is an important component for increasing the Young's modulus and coefficient of thermal expansion, as well as decreasing melt viscosity. However, when the quantity of CaO incorporated is less than 2%, the effect achieved is slight. When 25% is exceeded, stability tends to deteriorate. Thus, the content range is set to from 2 to 25%, preferably from 3 to 20%.

BaO is incorporated in a quantity of not less than 1% into the glass for chemical reinforcement of the present invention to help increase the coefficient of thermal expansion and enhance durability. However, when more than 15% is introduced, durability tends to deteriorate. Introducing BaO greatly increases the specific gravity of the glass. Accordingly, the content of BaO in glass I is set to within the range of from 1 to 15%, preferably from 1 to 14%.

Adding MgO, ZnO, and SrO in such a manner that the total content of MgO, CaO, SrO, BaO, and ZnO does not exceed the above stated range stabilizes the structure of the glass, raises the Young's modulus, and increases the coefficient of thermal expansion. A better effect is achieved by incorporating small amounts of various bivalent components than by incorporating a large quantity of one from among MgO, ZnO, and SrO. Thus, the contents are set to: 0 to 10% MgO, 0 to 15% SrO, and 0 to 10% ZnO; desirably 0 to 10% SrO, 0 to 8% ZnO, and 0 to 5% MgO; and preferably 0 to 1% MgO, 0 to 1% SrO, and 0 to 1% ZnO.

The amount of alkali metal oxide incorporated is desirably kept below a prescribed amount to prevent a drop in the glass transition temperature. However, when the amount of alkali metal oxide incorporated is kept down, glass melt properties deteriorate or the coefficient of thermal expansion tends to drop below the optimal range for a substrate employed in an information recording medium. Accordingly, to prevent such a drop in melt properties and such a reduction in the coefficient of thermal expansion, an alkaline earth metal oxide is introduced in the present invention. Since CaO is an alkaline earth metal oxide of relatively low molecular weight, it affords the advantage of tending not to increase the specific gravity of the glass. Although MgO also has the effect of inhibiting an increase in specific gravity, it has a greater tendency to reduce the chemical reinforcement effect than CaO. Thus, the proportion of CaO in the alkaline earth metal oxide is desirably high. Specifically, the quantities of each of the above-stated components are desirably adjusted so that the ratio of CaO/(MgO+CaO+SrO+BaO) is greater than or equal to 0.5, desirably greater than or equal to 0.55, and preferably greater than or equal to 0.6. Further, since alkaline earth metal oxides increase the melt properties of the glass without compromising the glass transition temperature as set forth above, increasing the coefficient of thermal expansion, the total content of MgO, CaO, SrO, and BaO is desirably from 10 to 30%, preferably from 12 to 30%, and more preferably from 12 to 25%.

Further, among the alkaline earth metal oxides, BaO enhances the devitrification property of the glass, and compared to MgO, CaO, and SrO, plays a greater role in increasing the coefficient of thermal expansion. Accordingly, the ratio of the content of BaO relative to the total content of MgO, CaO, SrO, and BaO (BaO/(MgO+CaO+SrO+BaO) incorporated is greater than or equal to 0.15, desirably greater than or equal to 0.16, and preferably greater than or equal to 0.17.

$Na_2O$ and $K_2O$ are components that are useful in decreasing the viscosity of the glass melt, promoting melting of the glass, and greatly increasing thermal expansion. In particular, $Na_2O$ is used to effect reinforcement by substituting by ion exchange potassium ions in the molten salt for sodium ions present in the glass. However, when the total content of $Na_2O$ and $K_2O$ exceeds 15%, not only does chemical durability deteriorate, but a large amount of alkali precipitates out on the surface of the glass, creating the risk of corrosion of an information recording layer, such as a magnetic layer. There are also cases in which the glass transition temperature drops, precluding the necessary thermal resistance. By contrast, when the total content is less than 3%, good chemical reinforcement becomes difficult, the glass melt properties deteriorate, and it becomes difficult to achieve prescribed thermal expansion characteristics. Accordingly, the total content of $Na_2O$ and $K_2O$ in glass I is 3 to 16%, desirably 3 to 15%, preferably 4 to 14%, and more preferably, 4 to 12%.

$Na_2O$ is an important component for achieving chemical reinforcement without decreasing the glass transition temperature. A content of greater than or equal to one % achieves good chemical reinforcement. Although to a lesser degree than $K_2O$, $Na_2O$ has the effect of increasing the coefficient of thermal expansion. Since a large amount of the $Na_2O$ precipitates out on the glass surface, the upper content limit is set to 8%. Accordingly, in glass I, the content of $Na_2O$ is from 1 to 10%, desirably from 1 to 9%, preferably from 1 to 8%, more preferably from 1 to 7%, and even more preferably from 1 to 5%.

$K_2O$ is an important component that greatly increases the coefficient of thermal expansion and reduces the ratio of precipitation onto the surface of the glass. The $K_2O$ content desirably exceeds 0%, preferably exceeds 1%, more preferably exceeds 2%, and even more preferably exceeds 4% to contribute to achieving desired thermal expansion characteristics and glass melt properties while suppressing the amount of alkali dissolving out. However, when the content exceeds 15%, the durability of the glass decreases and thermal resistance deteriorates due to a drop in the glass transition temperature. Accordingly, the content of $K_2O$ in glass I falls within a range of from 0 to 15%, desirably a range of from greater than 0% to less than or equal to 15%, preferably a range of from 1 to 15%, more preferably a range of from 2 to 15%, and even more desirably a range of from 4 to 13%.

$ZrO_2$ and $TiO_2$ are components that increase the chemical durability and rigidity of the glass. The addition of small quantities of $ZrO_2$ and $TiO_2$ improves the durability, modulus of elasticity, and brittleness of the glass. However, the introduction of $ZrO_2$ and $TiO_2$ also sharply increases specific gravity. When large quantities are introduced, there is a problem in that the glass has a strong tendency to devitrify.

Further, $ZrO_2$ is a component the introduction of which raises the Young's modulus. The introduction of one % or more achieves the above-stated effects, but when more than 12% is incorporated, the specific gravity increases. Accordingly, in glass I, the content of $ZrO_2$ is set to from 1 to 12%, desirably from 1 to 10%, and preferably from 3 to 10%.

$TiO_2$ has a lesser tendency than $ZrO_2$ to increase the Young's modulus, but produces little increase in specific gravity. When $TiO_2$ is added in a quantity exceeding 10%, specific gravity increases and the glass devitrifies. Accordingly, in glass I, the content of $TiO_2$ is set to from 0 to 10%, desirably from 0 to 8%. In consideration of water repellence, the content of $TiO_2$ is desirably 0%.

To achieve the above-stated desired objects, the total content of the above-listed components ($SiO_2$, $Al_2O_3$, CaO, BaO, $Na_2O$, $K_2O$, $ZrO_2$, MgO, SrO, ZnO, and $TiO_2$) is greater than or equal to 95%, desirably greater than or equal to 97%, and preferably greater than or equal to 98%. However, when necessary, the following components may also be added.

$Li_2O$ may be incorporated into glass I in addition to the above components. $Li_2O$ has the effect of increasing thermal expansion and raising the Young's modulus, but the proportion precipitating out onto the glass surface is high, and the addition of even a small quantity greatly lowers the glass transition temperature. Accordingly, the quantity incorporated is desirably kept to 3% or less, preferably 1% or less. More preferably, none is introduced. When $Li_2O$ is introduced, chemical reinforcement can be conducted by immersion in a molten salt containing potassium ions. Through the exchange of Li ions and Na ions, greater mechanical strength can be achieved. Thus, immersion in a molten salt containing sodium ions and potassium ions (for example, a mixed molten salt of sodium nitrate and potassium nitrate) is desirably employed for chemical reinforcement.

Rare earth elements can be introduced into glass I as optional components. Rare earth elements function to increase the thermal resistance, durability, and modulus of elasticity of a glass substrate, but they are expensive. Accordingly, from the perspective of cost, it is desirable not to incorporate rare earth elements. That is, the desired object can be achieved in glass I without incorporating rare earth elements.

From the perspective of achieving a better Young's modulus, thermal resistance, and durability, the incorporation of rare earth elements is desirable. When incorporating rare earth elements, they are desirably incorporated in a ratio of less than or equal to 5%, preferably less than or equal to 3%, based on the oxide.

Examples of the above-mentioned rare earth elements are Y, La, Gd, Yb, Pr, Sc, Sm, Tb, Dy, Nd, Eu, Ho, Er, Tm, and Lu. Examples in the form of oxides are $Y_2O_3$, $La_2O_3$, $Gd_2O_3$, $Yb_2O_3$, $Pr_2O_3$, $Sc_2O_3$, $Sm_2O_3$, $Tb_2O_3$, $Dy_2O_3$, $Nd_2O_3$, $Eu_2O_3$, $Tb_2O_3$, $Er_2O_3$, $Tm_2O_3$, and $Lu_2O_3$. $Y_2O_3$ is desirably employed as the oxide of a rare earth element. When employing $Y_2O_3$, there is a substantial increase in the Young's modulus without a large increase in specific gravity. However, there is a sharp drop in the stability of the glass. Thus, the content is desirably less than or equal to 8%, preferably less than or equal to 5%. Whether or not to incorporate a rare earth element may be suitably determined based on the above-stated circumstances.

In addition to the above-listed components, a defoaming agent may be incorporated into glass I to improve the melt properties, clarity, and moldability of the glass. Examples are $As_2O_3$, $Sb_2O_3$, fluorides, chlorides, and $SO_3$. The quantity incorporated need only fall within a suitable range for the defoaming agent employed; an overall ratio of less than or equal to 2 weight % may serve as an outer percentage. In particular, $Sb_2O_3$ and $As_2O_3$ are antifoaming agents with strong antifoaming effects, keeping foaming in the glass to an extremely low level or preventing it entirely. When residual bubbles in the glass appear on the substrate surface during polishing, they produce distortion that compromises the smoothness of the surface. Of these, the incorporation of $Sb_2O_3$ is preferable. In consideration of the effect on the environment, it is desirable not to employ arsenic compounds such as $As_2O_3$. In the present invention, the introduction of a foaming agent in the form of from 0 to 1 weight % of just $Sb_2O_3$, preferably from 0.1 to 1 weight % of just $Sb_2O_3$ as an outer percentage, is desirable.

It is possible to combine the various components within the above-stated desirable composition ranges into even more desirable composition ranges. Among these, one such set of desirable composition ranges is:

| | |
|---|---|
| $SiO_2$ | 50 to 67% |
| $Al_2O_3$ | 2 to 10% |
| (where the total of $SiO_2$ and $Al_2O_3$ is 57 to 79%) | |
| CaO | 3 to 20% |
| BaO | 1 to 14% |
| MgO | 0 to 10% |
| SrO | 0 to 10% |

| | |
|---|---|
| ZnO | 0 to 8% |
| (where the total of MgO, CaO, SrO, BaO and ZnO is 4 to 30%) | |
| Na$_2$O | 1 to 10% |
| K$_2$O | greater than 0%, less than or equal to 13% |
| (where the total quantity of Na$_2$O and K$_2$O is from 5 to 14%) | |
| ZrO$_2$ | 1 to 10% and |
| TiO$_2$ | 0 to 8%. |

In the above more desirable composition ranges, the total quantity of MgO, CaO, SrO, BaO, and ZnO is from 3 to 25%. In the above composition, the content of Na$_2$O is desirably from 1 to 9%, preferably from 1 to 5%. The content of ZrO$_2$ is preferably from 3 to 10%.

In a mode not employing rare earth elements, the total content of SiO$_2$, Al$_2$O$_3$, CaO, BaO, MgO, SrO, ZnO, Na$_2$O, K$_2$O, ZrO$_2$, and TiO$_2$ is desirably 100%. The above-described defoaming agent is also desirably added to this composition. The alkali metal oxides are desirably limited to Na$_2$O and K$_2$O from the perspective of enhancing melt properties and thermal resistance while suppressing the dissolution of alkali. In more preferable compositions, the total quantities of SiO$_2$, Al$_2$O$_3$, CaO, BaO, Na$_2$O, K$_2$O, and ZrO$_2$ amount to 100%; the total quantities of SiO$_2$, Al$_2$O$_3$, CaO, BaO, MgO, Na$_2$O, K$_2$O, and ZrO$_2$ amount to 100%; and the total quantities of SiO$_2$, Al$_2$O$_3$, CaO, BaO, Na$_2$O, K$_2$O, ZrO$_2$, and TiO$_2$ amount to 100%. The above-described foaming agent may be added within the above-stated compositional ranges. The addition of Sb$_2$O$_3$ as foaming agent is particularly desirable. The quantity incorporated desirably falls within a range of from 0 to 1 weight %, preferably 0.1 to 1 weight %, as an outer percentage.

In a mode incorporating alkaline earth elements, the total quantities of SiO$_2$, Al$_2$O$_3$, CaO, BaO, MgO, SrO, ZnO, Li$_2$O, Na$_2$O, K$_2$O, ZrO$_2$, TiO$_2$, B$_2$O$_3$, and rare earth element oxides desirably amount to 100%. Therein, it is desirable to keep the total quantity of rare earth element oxides to 5% or less. As defoaming agents, As$_2$O$_3$, Sb$_2$O$_3$, fluorides, chlorides, and SO$_3$ may be added in suitable quantities to the glass. However, the quantity added is desirably kept to 2% or less, preferably 1% or less, as an outer percentage. Due to environmental concerns, it is desirable not to employ arsenic compounds such as As$_2$O$_3$. Further, the introduction of from 0.1 to 1 weight % of Sb$_2$O$_3$ as an outer percentage is desirable to reduce bubbles.

In all of the above-described glasses, glass melt properties are good, no undissolved material is observed in the glass, and no crystal grains are observed in the glass. That is, each of the glasses is in an amorphous state.

The glass transition temperature of glass I is desirably greater than or equal to 600° C., preferably greater than or equal to 620° C., more preferably greater than or equal to 650° C., and even more preferably greater than or equal to 660° C.

The second glass for use in chemical reinforcement ("glass II" hereinafter) of the present invention exhibits a glass transition temperature of greater than or equal to 600° C., desirably greater than or equal to 620° C., and can be employed in substrates for information recording media employed in perpendicular magnetic recording systems by being subjected to chemical reinforcement. Since it exhibits a glass transition temperature of greater than or equal to 600° C., preferably greater than or equal to 620° C., it does not deform when exposed to high temperatures of about 400-600° C., maintaining a good shape. Thus, glass II exhibits resistance to heat in the high-temperature film formation and high-temperature heat treatment to which magnetic recording mediums employed in a perpendicular magnetic recording systems are subjected. In particular, it is suited to use as a substrate for a magnetic recording medium employed in a perpendicular magnetic recording system. The glass transition temperature of glass II is preferably greater than or equal to 650° C., more preferably greater than or equal to 660° C. The composition of glass II comprises SiO$_2$, Al$_2$O$_3$, ZrO$_2$, Na$_2$O, and a total of 3 to 15 mol % of K$_2$O, and a total of 3 to 30 mol % of MgO, CaO, SrO, BaO, and ZnO (where the ratio of the content of CaO to the combined content of MgO, CaO, SrO, and BaO is greater than or equal to 0.5). In these composition ranges, the ratio of the content of BaO to the total content of MgO, CaO, SrO, and BaO, BaO/(MgO+CaO+SrO+BaO) when given as mol %, is greater than or equal to 0.15. Such glasses desirably comprise 47-70 mol % of SiO$_2$, 1 to 10 mol % of Al$_2$O$_3$ (where the total content of SiO$_2$ and Al$_2$O$_3$ is from 57 to 80 mol %), and 1 to 12 mol % of ZrO$_2$. Glasses incorporating SiO$_2$, Al$_2$O$_3$, CaO, BaO, Na$_2$O, K$_2$O, and ZrO$_2$, as well as glasses comprising SiO$_2$, Al$_2$O$_3$, CaO, BaO, MgO, Na$_2$O, K$_2$O, and ZrO$_2$, are desirable. Both such glasses also desirably fall within the compositional ranges of glass I.

Due to the above-stated compositions, glasses I and II exhibit a Young's modulus of greater than or equal to 75 GPa, which is much higher than the Young's modulus (about 70 GPa) of the aluminum substrates conventionally employed in information recording media. Thus, it is possible to provide a substrate for information recording media having high strength, good stability during high speed rotation, and undergoing little deformation (elastic deformation) of the substrate when rotated at high speed. The Young's modulus of glass I and glass II is preferably greater than or equal to 78 GPa. To obtain glass with good stability, the Young's modulus is desirably kept to less than or equal to 100 GPa. The Young's modulus does not change as the result of chemical reinforcement.

The first substrate for information recording media ("substrate A" hereinafter) of the present invention is characterized by being comprised of glass I or glass II and being, chemically reinforced.

The second substrate for information recording media ("substrate B" hereinafter) of the present invention is characterized by being comprised of a chemically reinforced glass having a glass transition temperature of greater than or equal to 600° C., preferably greater than or equal to 620° C., and a bending strength of greater than or equal to 15 kgf/mm$^2$ after being heated to 570° C. for 2 hours. Glass I and glass II are desirable as the above-mentioned glasses. Glasses comprising SiO$_2$, Al$_2$O$_3$, ZrO$_2$; a total of 3 to 15 mol % of Na$_2$O, and K$_2$O; a total of 3 to 30 mol % of MgO, CaO, SrO, BaO, and ZnO (where the ratio of CaO to the total content of MgO, CaO, SrO, and BaO is greater than or equal to 0.5) are desirable. With the glasses of the above compositional ranges, glasses having the ratio of the BaO content to the total content of MgO, CaO, SrO, and BaO denoted as mol %, BaO/(MgO+CaO+SrO+BaO) is greater than or equal to 0.15 are desirable. With the above glasses, glasses comprising 47 to 70 mol % SiO$_2$ and 1 to 10 mol % Al$_2$O$_3$ (where the total content of SiO$_2$ and Al$_2$O$_3$ is 57 to 80 mol %); and 1 to 12 mol % ZrO$_2$ are also desirable. Glasses comprising SiO$_2$, Al$_2$O$_3$, CaO, BaO, Na$_2$O, K$_2$O, and ZrO$_2$, as well as glasses comprising SiO$_2$, Al$_2$O$_3$, CaO, BaO, MgO, Na$_2$O, K$_2$O, and ZrO$_2$ are also desirable. In the same manner as substrate B, substrate A is desirably comprised of a glass exhibiting a bending strength of greater than or equal to 15 kgf/mm$^2$ after being heated to 570° C. for two hours. Both substrates A and B preferably have a bending strength as set forth above of greater than or equal to 17 kgf/mm$^2$, more preferably greater than or equal to 20 kgf/mm$^2$, and even more preferably greater than or equal to 25 kgf/mm$^2$. When the above-described bending strength following heating is greater than or equal to 15 kgf/mm$^2$, a substrate for information recording media that is capable of maintaining high strength after heat treatment can be obtained. Within the above-stated ranges, it suffices to set the above bending strength to less than or equal to 100 kgf/mm$^2$ to obtain a glass of high stability. The substrate for information recording media of the present invention having a bending strength within the above-stated range undergoes little relaxation following high-temperature heat treatment of the compression stress layer near the glass surface formed by chemical reinforcement. Thus, based on this substrate, it is possible to provide a substrate for glass information recording media capable of maintaining high strength even after heat treatment. Due to this property, it is possible to maintain a desired strength even when a film formed at high temperature on a substrate comprised of glass having a bending strength within the above-stated range is subjected to high-temperature treatment such as high-temperature annealing, and the strength of the substrate remains high even with exposure to sharp temperature change during the above-mentioned high-temperature treatment. Thus, the substrate tends not to break and is easy to handle.

The bending strength can be measured in a three-point bending test over a 30 mm span with a rate of weight increase of 0.5 mm/s using a thin sheet sample measuring 40×10×1 mm. The edge surfaces (40×1 mm surfaces and 10×1 mm surfaces) of the sample employed are optically polished.

In the substrate for information recording media of the present invention, when the bending strength before chemical reinforcement of the glass constituting the substrate is denoted as $f_b$, and the bending strength after maintaining the chemically reinforced glass at a temperature T [° C.] (where T denotes a temperature selected between 20 and 570° C.) for two hours is denoted as $f_T$, the value of $(f_T-f_b)/f_b$ is desirably greater than or equal to 0.5, preferably greater than or equal to 0.52. In the substrate for information recording media of the present invention, when the value of $(f_T-f_b)/f_b$ is greater than or equal to 0.5, it is possible to obtain a substrate for information recording media having adequate bending strength during the formation and heat treatment of the information recording layer; for example, the formation and heat treatment of an information recording layer on an information recording medium in a perpendicular magnetic recording system. The above-mentioned heating for two hours at temperature T is conducted in air. From the perspective of achieving better chemical reinforcement while contributing to higher stability of the glass, the value of $(f_T-f_b)/f_b$ is desirably kept less than or equal to 9. The determination of whether or not the value of $(f_T-f_b)/f_b$ is greater than or equal to a prescribed value is made by measuring the bending strength $f_b$ and the bending strength $f_{570}$ of the above-described glass after maintaining it for two hours at 570° C. following chemical reinforcement, calculating the value of $(f_{570}-f_b)/f_b$, and confirming that this value is greater than or equal to the desired value. The determination of whether or not the value of $(f_T-f_b)/f_b$ is less than or equal to a desired value is made by measuring the bending strength $f_b$ and the bending strength $f_{570}$ of the above-described glass after maintaining it for two hours at 570° C. following chemical reinforcement, calculating the value of $(f_{570}-f_b)/f_b$, and confirming that this value is less than or equal to the desired value.

In the substrate for information recording media of the present invention, the value of $(f_{20}-f_b)/f_b$ for a bending strength $f_{20}$ at 20° C. is desirably greater than or equal to 1, preferably greater than or equal to 1.2. From the perspectives of achieving better stability and chemical reinforcement of the glass, the value of $(f_{20}-f_b)/f_b$ is desirably less than or equal to 9.

In the substrate for information recording media of the present invention, the average coefficient of linear thermal expansion at 30 to 300° C. of the glass constituting the substrate is desirably greater than or equal to $60\times10^{-7}K^{-1}$, preferably from $60\times10^{-7}$ to $120\times10^{-7}K^{-1}$, and more preferably from $70\times10^{-7}$ to $120\times10^{-7} K^{-1}$. Imparting an average coefficient of linear thermal expansion within the above-stated range to the substrate for information recording media of the present invention yields a glass with thermal expansion characteristics close to those of a metal. Thus, it is possible to provide a substrate for glass information recording media that can be firmly secured with a metal fixture. The material constituting this fixture can be a metal such as stainless steel, or a ceramic with closer thermal expansion characteristics.

For the same reason as above, at 100 to 300° C., an average coefficient of linear thermal expansion of greater than or equal to $70\times10^{-7}K^{-1}$ is desirable, from $70\times10^{-7}$ to $120\times10^{-7} K^{-1}$ is preferred, and from $75\times10^{-7}$ to $120\times10^{-7} K^{-1}$ is of even greater preference.

The liquid phase temperature of the glass constituting the substrate for information recording media of the present invention is desirably less than or equal to 1,200° C., preferably 1,050° C. A liquid phase temperature of less than or equal to 1,200° C. yields a glass having good resistance to devitrification.

[Manufacturing Methods]

The glass for chemical reinforcement and the glass constituting the substrate for information recording media of the present invention can be manufactured by known manufacturing methods using existing equipment. For example, a homogeneous glass melt obtained by the high-temperature melt method—that is, melting prescribed proportions of glass starting materials in air or in an inert gas atmosphere, and homogenizing the glass by bubbling, stirring, or the like—can be molded into a desired form such as sheet glass by a known molding method such as pressing, down drawing, or floating. However, in glass containing at a minimum $Sb_2O_3$ or $As_2O_3$, since the $Sb_2O_3$ or $As_2O_3$ reacts with the molten metal employed in the floating method, it is desirable to employ the pressing or down drawing method, with the pressing method being particularly desirable. The reason the glass for chemical reinforcement and the glass constituting the substrate for information recording media of the present invention can be molded by the usual methods despite having the above-described high glass transition temperatures is that the liquid phase temperature of these glasses, at less than or equal to 1,200° C., is low and they have good resistance to devitrification.

The chemical reinforcement treatment of the glass for chemical reinforcement and of the substrate for information recording media of the present invention can be conducted by known methods such as immersing the glass in molten salt. A molten salt comprising potassium nitrate is desirably employed. Specifically, the molded glass is immersed in the molten salt of an alkali metal, preferably a molten salt containing potassium (for example, potassium nitrate molten salt) to exchange alkali metal ions in the molten salt for alkali metal ions in the glass (particularly those near the glass surface), thereby forming a compressive stress (chemically reinforced) layer on the glass surface. The ion exchange is desirably conducted until the above-described desirable properties are achieved. In most chemical reinforcement, lithium ions in the glass also exchange with sodium ions and/or potassium ions in the molten salt. In that case, a large quantity of $Li_2O$ must be incorporated into the glass. When the quantity of $Li_2O$ required by ion exchange is incorporated, the glass transition temperature drops sharply. Thus, in the present invention, it is desirable to conduct chemical reinforcement by means of an ion exchange treatment that replaces sodium ions with potassium ions. However, when $Li_2O$ is introduced into the glass, it is possible to conduct chemical reinforcement by having lithium ions in the glass exchange with sodium ions in the molten salt and sodium ions in the glass exchange with potassium ions in the molten salt.

Since the substrate for information recording media of the present invention affords high strength due to good chemical reinforcement, has good melt properties, and has a high glass transition temperature, is can be suitably employed as a substrate for information recording media in perpendicular magnetic recording systems.

The present invention can provide substrates for information recording media such as the following:
(1) A substrate of glass having a specific gravity of from 2.4 to 3.0, preferably from 2.4 to 2.9.
(2) A substrate of glass having a modulus of rigidity of greater than or equal to 30 GPa, preferably from 30 to 35 GPa.
(3) A substrate of glass having a specific modulus of greater than or equal to $26 \times 10^6$ Nm/kg, preferably from $26 \times 10^6$ to $32 \times 10^6$ Nm/kg.
(4) A substrate of glass having a Poisson ratio of from 0.22 to 0.25.

The use of the substrate for an information recording medium of the present invention having these various properties makes it possible to provide an information recording medium and a substrate for information recording media that are stable and can be rotated at high speed.

For example, when manufacturing a disk substrate, a molded glass member can be processed to make it round, center punched, and the inner and outer perimeter surfaces thereof processed, ground, and polished to obtain a disk-shaped information recording medium substrate of desired size. During polishing, lapping can be conducted with a polishing material or diamond pellets and polishing can be conducted with a polishing material such as cerium oxide to achieve a surface precision falling within the range of, for example, 0.1 to 0.6 nm. Following processing, the substrate surface is desirably washed with a cleaning solution to clean it. Next, the substrate is immersed in a molten salt containing potassium nitrate at a prescribed temperature, chemically reinforced, and washed again to obtain a clean substrate. An alkali or acid solution such as hydrofluoro-silicic acid solution, or an organic solvent can be suitably selected for use as the cleaning solution.

The substrate for information recording media of the present invention can be employed as a substrate for magnetic recording media. In particular, it can be suitably employed as a substrate for magnetic recording media in perpendicular magnetic recording systems. That is, since the substrate for information recording media of the present invention has a glass transition temperature that is substantially higher than the temperature reached during heat treatment and an adequately high Young's modulus, it yields a substrate that does not deform during heat treatment during the manufacturing process and does not elastically deform during high-speed rotation.

[Information Recording Media]

The information recording medium of the present invention can be manufactured by providing an information recording layer on the above-described substrate for information recording media. Since the chemically reinforced glass having good thermal resistance and high strength of the present invention is employed as substrate, the information recording medium of the present invention affords the advantages of high strength and permitting high-temperature processing. By suitably selecting the information recording layer, it is possible to employ the above-described information recording medium in various forms of information recording media. Examples of such media are magnetic recording media, photomagnetic recording media, and optical recording media.

Since the information recording medium of the present invention has both high thermal resistance and high strength, it is particularly suited to use as a magnetic recording medium in perpendicular magnetic recording systems. Information recording media employed in perpendicular magnetic recording systems can provide information recording media capable of handling higher recording densities. That is, the magnetic recording media employed in perpendicular magnetic recording systems have a recording density (for example, 1 TBit/$(2.5 \text{ cm})^2$) that is higher than the surface recording density ($100 \text{ GBit}/(2.5 \text{ cm})^2$ or more) of the conventional magnetic recording media employed in longitudinal magnetic recording systems. Thus, higher density recording can be achieved.

The information recording medium of the present invention and the method of manufacturing the same will be specifically described below.

In the above information recording medium, an information recording layer is present on the above-described substrate for information recording media. It is possible to manufacture an information recording medium such as a magnetic disk by sequentially depositing on the above-described glass substrate, an underlayer, a magnetic layer, a protective layer, a lubricating layer, and the like. The magnetic layer (information recording layer) is not specifically limited; by way of example, it may be in the form of a Co—Cr based (here the term "based" means a material comprising the stated substances), Co—Cr—Pt based, Co—Ni—Cr based, Co—Ni—Pt based, Co—Ni—Cr—Pt based, or Co—Cr—Ta based magnetic layer. A Ni layer, Ni—P layer, Cr layer, or the like may be employed as the underlayer. Examples of the materials employed in magnetic layers (information recording layer) suited to high recording density are CoCrPt-based alloy materials and, above all, CoCrPtB-based alloy materials. FePt-based alloy materials are also suitable. These magnetic layers are particularly useful when employed as magnetic materials in perpendicular magnetic recording systems. CoCrPt-based materials can be used to form films at elevated temperatures of from 300 to 500° C. and FePt-based alloy materials can be used to form films at elevated temperatures of from 500 to 600° C., or heat treated following film formation, to adjust the crystal orientation or crystal structure and achieve a structure suited to high recording density.

A nonmagnetic underlayer and/or soft magnetic underlayer can be employed as the underlayer. A nonmagnetic underlayer is chiefly provided to reduce the size of the crystal grains of the magnetic layer or control the crystal orientation of the magnetic layer. A bcc-based crystal underlayer such as a Cr-based underlayer has the effect of promoting in-plane orientation, and is thus desirably employed in magnetic disks employed in in-plane (longitudinal) recording systems. hcp-based crystalline underlayers such as Ti-based underlayers and Ru-based underlayers have the effect of promoting vertical orientation, and may thus be employed in magnetic disks employed in perpendicular magnetic recording systems. Amorphous underlayers have the effect of reducing the size of the crystal grains in the magnetic layer.

Soft magnetic underlayers are primarily employed in perpendicular magnetic recording disks to enhance magnetic pattern recording on perpendicular magnetic recording layers (magnetic layers) by magnetic heads. Fully utilizing the effect of a soft underlayer requires a layer with a high saturation magnetic flux density and high magnetic permeability. Thus, it is desirable to conduct film formation at high temperature or conduct a heat treatment following film formation. Examples of such soft magnetic layer materials are Fe-based soft magnetic materials such as FeTa-based soft magnetic materials and FeTaC-based soft magnetic materials. CoZr-based soft magnetic materials and CoTaZr-based soft magnetic materials are also desirable.

A carbon film or the like can be employed as the protective layer. A perfluoropolyether-based lubricant or the like can be employed to form the lubricating layer.

An example of a desirable mode of a perpendicular magnetic recording disk is a magnetic disk obtained by sequentially forming on the glass substrate of the present invention a soft magnetic underlayer, amorphous nonmagnetic underlayer, crystalline nonmagnetic underlayer, perpendicular magnetic recording layer (magnetic layer), protective layer, and lubricating layer.

In the case of a magnetic recording medium employed in a perpendicular magnetic recording system, the configuration of the films formed on the substrate may be in the form of a single-layer film consisting of a perpendicular magnetic recording layer formed on a glass substrate of nonmagnetic material, a two-layer film consisting of a soft magnetic layer and a magnetic recording layer sequentially deposited on the glass substrate, and a three-layer film consisting of a hard magnetic layer, soft magnetic layer, and magnetic recording layer sequentially deposited on the glass substrate. Of these, the two-layer film and three-layer film are preferred because they are better suited than the single-layer film to high recording density and maintaining a stable magnetic moment.

The characteristics of such multilayer magnetic film perpendicular magnetic recording media can generally be enhanced by high-temperature heat treatment (annealing) during or after film formation in a high-temperature sputtering unit at 300 to 600° C., preferably 400 to 600° C., to expose the substrate to an elevated temperature of 300 to 600° C., preferably 400 to 600° C. Since the substrate for information recording media of the present invention is comprised of glass having a glass transition temperature (Tg) of greater than or equal to 620° C., good smoothness can be maintained without deformation of the substrate in the above high-temperature heat treatment. Accordingly, the present invention yields an information recording medium such as a magnetic disk equipped with the above-described films on a flat substrate. Further, the above-described high-temperature heat treatment is conducted after chemical reinforcement of the substrate, but in the information recording medium of the present invention, since there is little relaxation of the compression stress layer in the substrate surface even after heat treatment, it is possible to obtain an information recording medium such as a magnetic disk of adequate mechanical strength. The dimensions of the substrate (such as a magnetic disk substrate) for information recording media and the information recording medium (such as a magnetic disk) of the present invention are not specifically limited. However, it is possible to reduce the size of the medium and the substrate to achieve a high recording density. Thus, the present invention can be applied not just to standard 2.5 inch diameter, but also smaller diameter (such as 1 inch) magnetic disk substrates and magnetic disks.

Embodiments

The present invention will be described next in greater detail through embodiments. The present invention is not limited to these embodiments.

(Embodiments 1 to 9)

Denoted as mol %, starting materials in the form of $SiO_2$, $Al_2O_3$, $Al(OH)_3$, $CaCO_3$, $BaCO_3$, $Na_2CO_3$, $K_2CO_3$, $TiO_2$, and $ZrO_2$ were weighed out to obtain from 300 to 1,500 g of glass starting materials designed to yield glasses having the compositions shown in Tables 1 and 2. These were intimately mixed to prepare batches, and the batches were charged to platinum crucibles and melted for 3 to 8 hours in air at a temperature of from 1,400 to 1,600° C. After melting, the glass melts were poured into carbon molds measuring 40×40×20 mm, cooled to the glass transition temperature, immediately placed in an annealing furnace, maintained for one hour, and then left to cool to room temperature in the furnace. When the glasses obtained were observed by microscope, no crystal grains were found. The glasses obtained had a high degree of homogeneity, exhibited no unmelted material, and were confirmed to have good melt properties. The glasses obtained in this manner were processed into thin sheets measuring 40×10×1 mm from which samples of glass for chemical reinforcement were prepared. The glasses were then processed into disk substrates with an outer diameter of 65.0 mm, a center hole diameter of 20.0 mm, and a thickness of 0.635 mm. The glass samples for chemical reinforcement and the disk substrates were processed by polishing their principal surfaces to render them flat and smooth. Surfaces other than the principal surfaces were also polished to eliminate minute scratches that could decrease strength, yielding smooth surfaces. Chemical reinforcement was conducted by immersing the disk substrates for the periods stated in Tables 1 and 2 in potassium nitrate molten salt at the temperatures stated in Tables 1 and 2.

Single samples of glass for chemical reinforcement were paired with single disk substrates to obtain nine pairs, or a total of 18 samples. The glass transition temperature, sag temperature, average coefficient of linear expansion at 30 to 300° C., average coefficient of linear expansion at 100 to 300° C., specific gravity, Young's modulus, modulus of rigidity, Poisson ratio, specific modulus, liquid phase temperature, bending strength $f_b$ prior to chemical reinforcement, bending strength $f_{20}$ after being maintained for 2 hours at 20° C. following chemical reinforcement, and bending strength $f_{570}$ after being heated in air for 2 hours at 570° C. after chemical reinforcement of each sample were then measured. The chemical reinforcement conditions, characteristics, and glass composition of each pair are given in Tables 1 and 2. A glass was prepared from each of the pairs by adding 0.5 weight % of $Sb_2O_3$ as an outer percentage and the same characteristics were measured. In the glasses to which $Sb_2O_3$ was added, microscopic examination revealed absolutely no bubbles.

The methods of measuring the various characteristics are indicated below.

(1) Glass Transition Temperature and Sag Temperature

Glass identical to the above-described samples was processed into a shape 5 mm in diameter×20 mm. A thermomechanical analyzer (TMA 8140) made by Rigaku Corp. was employed to conduct measurement at a rate of temperature increase of +4° C./min. $SiO_2$ was employed as the reference sample. The glass transition temperature was the temperature at which the viscosity of the glass reached $10^{13.3}$ dPa·s.

(2) Average Coefficient of Linear Thermal Expansion

Measured simultaneously with the glass transition temperature.

(3) Specific Gravity

Glass identical to the above-described samples was processed into a shape measuring 40×20×15 mm and measurement was conducted by Archimedes' method.

(4) Young's modulus, modulus of rigidity, Poisson ratio

Glass identical to the above-described samples was processed into a shape measuring 40×20×15 mm and measurement was conducted by an ultrasonic method.

(5) Specific Modulus

Calculated from the above Young's modulus and specific gravity by the equation (specific modulus=Young's modulus/specific gravity).

(6) Liquid phase temperature

The glass samples were placed in a platinum container with lid, fully melted at 1,500° C., maintained in a furnace set to a prescribed temperature, removed after a prescribed period had elapsed, and observed by optical microscopy to determine whether crystals had formed in the glass. The lowest temperature at which crystals were not produced was adopted as the liquid phase temperature.

(7) Bending strength

Measurement was conducted on thin-sheet samples (40×10×1 mm, lateral surfaces polished). Specifically, the three-point bending strength was measured over a 30 mm span at a weight increase rate of 0.5 mm/s.

As will be clear from Tables 1 and 2, the glass for chemical reinforcement and disk substrates of the present embodiments exhibited good characteristics in the form of a glass transition temperature of greater than 620° C., an average coefficient of linear thermal expansion at 30 to 300° C. of greater than or equal to $60 \times 10^{-7}$ $K^{-1}$, an average coefficient of linear thermal expansion at 100 to 300° C. of greater than or equal to $70 \times 10^{-7}$ $K^{-1}$, a specific gravity of from 2.4 to 3.0, a Young's modulus of greater than or equal to 75 GPa, a modulus of rigidity of greater than or equal to 30 GPa, a specific modulus of greater than or equal to $26 \times 10^6$ Nmlkg, a Poisson ratio of from 0.22 to 0.25, a bending strength following chemical reinforcement of greater than or equal to 15 kgf/$mm^2$, a bending strength following two hours of heating at 570° C. of greater than or equal to 15 kgf/$mm^2$, an $(f_T-f_b)/f_b$ of greater than or equal to 0.5, and an $(f_{20}-f_b)/f_b$ of greater than or equal to 1.

Each of the disk-shaped glass substrates of the present embodiment was suitable for use as a substrate in a standard 2.5-inch information recording medium. In particular, as substrates with high resistance to heat and high strength, they were suited for use as substrates in magnetic recording media, particularly magnetic recording media employed in perpendicular magnetic recording systems.

(Embodiment 10)

Disk-shaped substrates with an outer diameter of 27.4 mm, a center hole diameter of 7.0 mm, and a thickness of 0.381 mm were prepared from glasses having compositions identical to the glasses of Embodiments 1 to 9 and the glasses of Embodiment 1 to 9 to which $Sb_2O_3$ had been added. Specifically, homogenized glass melts were fed into a pressing mold, press molded, and gradually cooled to obtain disk-shaped substrates. These were subjected to mechanical processing such as grinding and polishing and then chemically reinforced. In addition to press molding, examples of methods that can be used to prepare the above-described substrate include the use of a method known such as float molding to form thin sheets of glass and processing these thin sheets of glass into a disk shape. The substrates for information recording media thus obtained were washed with a cleaning solution. These substrates were found to have good characteristics in the form of a bending strength after chemical reinforcement of greater than or equal to 15 kgf/$mm^2$, a bending strength after heating for 2 hours at 570° C. of greater than or equal to 15 kgf/$mm^2$, an $(f_T-f_b)/f_b$ value of greater than 0.5, and an $(f_{20}-f_b)/f_b$ value of greater than or equal to 1.

These substrates were suitable for use as substrates in standard one-inch information recording media, and in particular, as substrates with high thermal resistance and strength, such as substrates employed in magnetic recording media, particularly the substrates in magnetic recording media employed in perpendicular magnetic recording systems. These substrates were washed with a cleaning solution. Since the amount of alkali dissolving out of the glass constituting the substrates was extremely low, it was possible to prevent roughening of the surface of the substrate during cleaning. The center line average roughness Ra of the principal surface of each of the glass substrates following cleaning was from 0.1 to 0.6 nm.

The center line average roughness Ra of the glass substrates was measured by atomic force microscopy (AFM).

(Embodiment 11)

Magnetic disks for use in a perpendicular magnetic recording system were prepared from the glass substrates of Embodiment 10 following drying. In the formation of the magnetic recording layer, a two-layer film in which a soft magnetic layer and a magnetic recording layer were sequentially deposited, and a three-layer film, in which a hard magnetic layer, soft magnetic layer, and magnetic recording layer were sequentially deposited, were employed to manufacture two types of magnetic disks for use in a perpendicular magnetic recording system. In this process, the magnetic recording film was subjected to a high-temperature heat treatment at 400 to 600° C. However, since each of the substrates had a thermal resistance in the form of a glass transition temperature (Tg) of greater than or equal to 620° C., the substrates did not deform and a high degree of flatness was maintained. The various magnetic disks described above were then subsequently manufactured in the same manner as set forth above.

Due to the high glass transition temperature of the glass substrates of the present invention, they were suited to high-temperature processing to enhance the characteristics of the magnetic recording medium and to the preparation of magnetic films in a high-temperature sputtering device.

Although the example of a magnetic recording medium is described in the above embodiments, good results can be similarly achieved with substrates employed in other information recording media and with other information recording media, such as substrates and media employed in optical recording systems and photomagnetic recording systems.

TABLE 1

|  |  | Embod. 1 | Embod. 2 | Embod. 3 | Embod. 4 | Embod. 5 |
| --- | --- | --- | --- | --- | --- | --- |
| Glass composition | $SiO_2$ | 63.0 | 63.0 | 63.0 | 63.0 | 63.0 |
|  | $Al_2O_3$ | 4.0 | 4.0 | 4.0 | 4.0 | 4.0 |

TABLE 1-continued

|  |  | Embod. 1 | Embod. 2 | Embod. 3 | Embod. 4 | Embod. 5 |
|---|---|---|---|---|---|---|
| (mol %) | CaO | 13.0 | 13.0 | 13.0 | 13.0 | 13.0 |
|  | BaO | 3.0 | 3.0 | 3.0 | 3.0 | 3.0 |
|  | CaO + BaO | 16.0 | 16.0 | 16.0 | 16.0 | 16.0 |
|  | $Na_2O$ | 4.0 | 4.0 | 4.0 | 4.0 | 4.0 |
|  | $K_2O$ | 5.0 | 5.0 | 5.0 | 5.0 | 5.0 |
|  | $Na_2O + K_2O$ | 9.0 | 9.0 | 9.0 | 9.0 | 9.0 |
|  | $TiO_2$ | 4.0 | 4.0 | 4.0 | 4.0 | 4.0 |
|  | $ZrO_2$ | 4.0 | 4.0 | 4.0 | 4.0 | 4.0 |
|  | Total | 100 | 100 | 100 | 100 | 100 |
| Glass transition temperature [° C.] | | 679 | 679 | 679 | 679 | 679 |
| Sag temperature [° C.] | | 756 | 756 | 756 | 756 | 756 |
| Average coefficient of linear expansion at 30-300° C. [$\times 10^{-7} K^{-1}$] | | 79.5 | 79.5 | 79.5 | 79.5 | 79.5 |
| Average coefficient of linear expansion at 100-300° C. [$\times 10^{-7} K^{-1}$] | | 83.3 | 83.3 | 83.3 | 83.3 | 83.3 |
| Specific gravity | | 2.79 | 2.79 | 2.79 | 2.79 | 2.79 |
| Young's modulus [GPa] | | 82.7 | 82.7 | 82.7 | 82.7 | 82.7 |
| Modulus of rigidity [GPa] | | 33.4 | 33.4 | 33.4 | 33.4 | 33.4 |
| Poisson ratio | | 0.24 | 0.24 | 0.24 | 0.24 | 0.24 |
| Specific modulus [$\times 10^6$ Nm/kg] | | 29.6 | 29.6 | 29.6 | 29.6 | 29.6 |
| Liquid phase temperature [° C.] | | 1050 or less | 1050 or less | 1050 or less | 1050 or less | 1050 or less |
| Ion exchange temperature [° C.] | | 400 | 420 | 450 | 470 | 500 |
| Ion exchange time [hours] | | 3 | 3 | 3 | 3 | 3 |
| Bending strength [$kgf/mm^2$] | Before chemical reinforcement $f_b$ | 12.0 | 12.0 | 12.0 | 12.0 | 12.0 |
|  | After chemical reinforcement $f_{20}$ | 28.4 | 30.7 | 37.2 | 40.9 | 45.3 |
|  | After two hours heating at 570° C. $f_{570}$ | 18.6 | 22.3 | 24.5 | 25.9 | 31.1 |
|  | $(f_{570} - f_b)/f_b$ | 0.550 | 0.858 | 1.04 | 1.16 | 1.59 |
|  | $(f_{20} - f_b)/f_b$ | 1.37 | 1.56 | 2.10 | 2.41 | 2.78 |

TABLE 2

|  |  | Embod. 6 | Embod. 7 | Embod. 8 | Embod. 9 |
|---|---|---|---|---|---|
| Glass composition (mol %) | $SiO_2$ | 63 | 63 | 65 | 65 |
|  | $Al_2O_3$ | 4 | 5 | 5 | 5 |
|  | CaO | 13 | 12 | 13 | 12 |
|  | BaO | 3 | 3 | 3 | 4 |
|  | CaO + BaO | 16 | 15 | 16 | 16 |
|  | $Na_2O$ | 5 | 5 | 4 | 4 |
|  | $K_2O$ | 5 | 5 | 6 | 6 |
|  | $Na_2O + K_2O$ | 10 | 10 | 10 | 10 |
|  | $TiO_2$ | 3 | 3 | 0 | 0 |
|  | $ZrO_2$ | 4 | 4 | 4 | 4 |
|  | Total | 100 | 100 | 100 | 100 |
| Glass transition temperature [° C.] | | 663 | 670 | 671 | 671 |
| Sag temperature [° C.] | | 744 | 747 | 749 | 753 |
| Average coefficient of linear expansion at 30-300° C. [$\times 10^{-7} K^{-1}$] | | 84 | 83 | 79 | 78 |
| Average coefficient of linear expansion at 100-300° C. [$\times 10^{-7} K^{-1}$] | | 87 | 86 | 83 | 82 |
| Specific gravity | | 2.78 | 2.78 | 2.76 | 2.77 |
| Young's modulus [GPa] | | 82.3 | 82.3 | 81.5 | 79.9 |
| Modulus of rigidity [GPa] | | 33.2 | 82.2 | 33 | 32.3 |
| Poisson ratio | | 0.238 | 0.237 | 0.24 | 0.24 |
| Specific modulus [$\times 10^6$ Nm/kg] | | 29.6 | 29.6 | 29.6 | 28.8 |
| Liquid phase temperature [° C.] | | 1050 or less | 1050 or less | 1050 or less | 1050 or less |
| Ion exchange temperature [° C.] | | 420 | 420 | 420 | 420 |
| Ion exchange time [hours] | | 3 | 3 | 3 | 3 |
| Bending strength [$kgf/mm^2$] | Before chemical reinforcement $f_b$ | 11.0 | 11.0 | 12.0 | 13.0 |
|  | After chemical reinforcement $f_{20}$ | 32.0 | 33.2 | 29.5 | 30.1 |
|  | After two hours heating at 570° C. $f_{570}$ | 16.5 | 19.3 | 20.1 | 21.0 |
|  | $(f_{570} - f_b)/f_b$ | 0.50 | 0.75 | 0.67 | 0.62 |
|  | $(f_{20} - f_b)/f_b$ | 1.9 | 2.02 | 1.46 | 1.32 |

INDUSTRIAL APPLICABILITY

The chemically reinforced glass of the present invention is useful as a substrate for information recording media. In particular, it is useful as a substrate for magnetic recording media suited to the manufacture in high-temperature sputtering devices of magnetic films employed in perpendicular magnetic recording systems. Further, the substrate for information recording media employing the chemically reinforced glass of the present invention can be employed in magnetic recording media and the like.

The invention claimed is:

1. A glass for use in chemical reinforcement for use in the substrate of an information recording medium employed in a perpendicular magnetic recording system, in which the glass is in an amorphous state, exhibits the glass transition temperature of greater than or equal to 650° C., and has a Young's modulus of greater than or equal to 75 GPa and less than 100 GPa, wherein the glass has a composition comprising, denoted as mol %:

```
SiO₂ -              47% to 70%,
Al₂O₃ -             1% to 10%
(where the total of SiO₂ and Al₂O₃ is 57% to 80%),
Na₂O -              1% to 10%,
K₂O -               0 to 15%,
(where the total of Na₂O and K₂O is 3% to 16%),
Li₂O -              less than 1%, and
at least one of MgO, CaO, SrO, BaO, and ZnO, where
the total of MgO, CaO, SrO, BaO, and ZnO is 3% to 30%.
```

2. A substrate for use in an information recording medium characterized by consisting of the glasses of claim 1 and being chemically reinforced.

3. The substrate for use in an information recording medium of claim 2 which employs a chemically reinforced glass in which the bending strength following heating for two hours at 570° C. to is greater than or equal to 15 kgf/mm².

4. The substrate for an information recording medium of claim 2 in which, when the bending strength of the glass constituting the substrate prior to chemical reinforcement is denoted as fb and the bending strength of the glass when maintained for two hours at a temperature T [° C.] (where T denotes any temperature of from 20 to 570° C.) after having been chemically reinforced is denoted as fT, the value of (fT−fb)/fb is greater than or equal to 0.5.

5. The substrate for use in an information recording medium of claim 4, wherein the value of (f20−fb)/fb for the bending strength f20 at T=20° C. is greater than or equal to 1.

6. The substrate for use in an information recording medium of claim 2, wherein the average coefficient of linear expansion at 30 to 300° C. of the glass constituting the substrate is greater than or equal to $60 \times 10^{-7} K^{-1}$.

7. The substrate for use in an information recording medium of claim 2 that is chemically reinforced by an ion exchange treatment in which sodium ions are replaced with potassium ions.

8. The substrate for use in an information recording medium of claim 2 that is employed as a substrate for an information recording medium employed in a perpendicular magnetic recording system.

9. An information recording medium characterized by comprising an information recording layer on the substrate for an information recording medium of claim 2.

10. The information recording medium of claim 9 that is a magnetic recording medium employed in a perpendicular magnetic recording system.

11. The information recording medium of claim 9 characterized by being manufactured by subjecting a substrate having an information recording layer to a heat treatment at a maximum temperature of 300 to 600° C.

12. A method of manufacturing an information recording medium comprising a step of forming a multilayered film comprising an information recording layer on the substrate for an information recording medium of claim 2, characterized by further comprising the heating of the substrate on which the multilayered film has been formed to a temperature of from 300 to 600° C.

13. The glass for use in chemical reinforcement for use in the substrate of an information recording medium employed in a perpendicular magnetic recording system according to claim 1, wherein the glass exhibits the glass transition temperature of greater than or equal to 660° C.

14. The glass for use in chemical reinforcement for use in the substrate of an information recording medium employed in a perpendicular magnetic recording system according to claim 1, wherein the glass comprises less than 1 mol % of Li₂O.

15. The glass for use in chemical reinforcement for use in the substrate of an information recording medium employed in a perpendicular magnetic recording system according to claim 1, wherein the glass comprises 0 to 8 mol % of TiO₂.

16. The glass for use in chemical reinforcement for use in the substrate of an information recording medium employed in a perpendicular magnetic recording system according to claim 1, wherein the glass does not comprise TiO₂.

17. A substrate for use in an information recording medium characterized by consisting of the glasses of claim 13 and being chemically reinforced.

18. A substrate for use in an information recording medium characterized by consisting of the glasses of claim 14 and being chemically reinforced.

19. A substrate for use in an information recording medium characterized by consisting of the glasses of claim 15 and being chemically reinforced.

20. A substrate for use in an information recording medium characterized by consisting of the glasses of claim 16 and being chemically reinforced.

21. An information recording medium characterized by comprising an information recording layer on the substrate for an information recording medium of claim 17.

22. An information recording medium characterized by comprising an information recording layer on the substrate for an information recording medium of claim 18.

23. An information recording medium characterized by comprising an information recording layer on the substrate for an information recording medium of claim 19.

24. An information recording medium characterized by comprising an information recording layer on the substrate for an information recording medium of claim 20.

* * * * *